United States Patent
Ivanic et al.

(10) Patent No.: US 7,092,880 B2
(45) Date of Patent: Aug. 15, 2006

(54) APPARATUS AND METHOD FOR QUANTITATIVE MEASUREMENT OF VOICE QUALITY IN PACKET NETWORK ENVIRONMENTS

(75) Inventors: Branislav Ivanic, Mountain View, CA (US); Eli Jacobi, Tel Aviv (IL); Peter Kozdon, Santa Clara, CA (US); Noboru Nishiya, San Jose, CA (US); Christoph A. Aktas, Augsburg (DE)

(73) Assignee: Siemens Communications, Inc., Boca Raton, FL (US)

( * ) Notice: Subject to any disclaimer, the term of this patent is extended or adjusted under 35 U.S.C. 154(b) by 849 days.

(21) Appl. No.: 10/255,309

(22) Filed: Sep. 25, 2002

(65) Prior Publication Data

US 2004/0059572 A1   Mar. 25, 2004

(51) Int. Cl.
*G10L 11/00* (2006.01)
*H04M 3/22* (2006.01)

(52) U.S. Cl. ...................................... 704/231; 704/233

(58) Field of Classification Search .................. None
See application file for complete search history.

(56) References Cited

U.S. PATENT DOCUMENTS

| 4,550,425 | A | * | 10/1985 | Andersen et al. ........... 704/212 |
|---|---|---|---|---|
| 4,847,885 | A | | 7/1989 | Vittorelli ........................ 379/6 |
| 5,315,649 | A | * | 5/1994 | Foster et al. ........... 379/355.04 |
| 5,539,806 | A | * | 7/1996 | Allen et al. .................... 379/52 |
| 5,553,059 | A | | 9/1996 | Emerson et al. .............. 370/14 |
| 5,848,384 | A | * | 12/1998 | Hollier et al. .............. 704/231 |

* cited by examiner

*Primary Examiner*—David D. Knepper

(57) ABSTRACT

A system and a method for quantitatively measuring voice transmission quality within a voice-over-data-network such as a telephony-enabled LAN utilize speech recognition to measure the quality of voice transmission. A first aspect of the invention involves determining the suitability of the LAN for voice communications. A voice sample is selected by a first terminal and is transmitted to a second terminal on the LAN a number of times. The first terminal introduces an incrementally larger quantity of noise into each transmission of the voice packet. The second terminal performs speech recognition for each successively received voice sample and determines the accuracy for each speech recognition session. The amount of noise which drops the speech recognition accuracy below a threshold level provides a measure of the suitability of the LAN for voice communications. During normal operation of the LAN, speech recognition accuracy tests are performed between various endpoints to monitor voice transmission quality.

22 Claims, 4 Drawing Sheets

APPARATUS AND METHOD FOR QUANTITATIVE MEASUREMENT OF VOICE QUALITY IN PACKET NETWORK ENVIRONMENTS

TECHNICAL FIELD

The present invention generally relates to methods and systems for monitoring quality of voice transmissions over communications networks and, more specifically, to a method and a system for monitoring quality of voice transmissions over a packet-based communications network utilizing speech recognition.

DESCRIPTION OF THE RELATED ART

In conventional analog telephony over a Public Switch Telephone Network (PSTN), when a caller makes a call, he or she receives a dial tone from a central office upon taking a telephone off-hook. When the caller dials from the telephone after receiving the dial tone, the telephone typically utilizes Dual Tone Multifrequency (DTMF) tones to communicate the telephone number of the called party to the central office. A DTMF register at the central office processes the DTMF tones to obtain the called party's telephone number. The central office does not dedicate a DTMF register to each local loop to each of its customers, because of the high cost of doing so. As a general rule, at any one time, the number of incoming calls to the central office is substantially below the number of local loops to customers. Consequently, the local loops can share DTMF registers.

During periods of heavy traffic, access to DTMF registers can present a significant bottleneck to accessing the telephone network to make a call. If the caller goes off-hook during such a high traffic period, it is possible that the caller will not receive a dial tone. The absence of a dial tone indicates that there are no registers available to process the DTMF tones. If the caller maintains the phone in the off-hook state, eventually a DTMF register will become available and the caller will be able to place the call. When the caller dials the number of the called party, the caller will be put through to the called party by the central office, if the local loop to the called party is not busy when the call is placed. Once the called party goes off-hook, the two endpoints of the call are connected via the central office by the two local loops, one connecting the caller to the central office, the other connecting the called party to the central office. Significantly, both local loops are dedicated to the call, so that there is no external competition for bandwidth in the call. Consequently, even if traffic to the central office increases after the call has been connected, the voice transmission quality is not detrimentally affected.

Techniques for monitoring voice transmission quality in conventional analog and digital networks rely on the assumption that voice transmission quality remains relatively constant during a call. U.S. Pat. No. 4,847,885 to Vittorelli describes a system for measuring and automatically compensating for distortions within a connection between a telephone and a central voice processing unit, such as a Private Branch Exchange (PBX). The system includes a portable acoustic device in which digital data of reference voice samples is stored. The digital data of the voice samples is also stored at the PBX. The acoustic device can be employed at any telephone connected to the PBX to transmit the voice samples to the PBX.

For a particular connection that is tested, the PBX compares a received voice sample to the corresponding stored voice sample to measure the distortion and attenuation introduced into the transmission by the connection. The PBX utilizes the measurement to compensate for distortion and attenuation, thereby improving voice transmission quality for voice signals subsequently transmitted over the connection between two endpoints. The Vittorelli system relies on the assumption that the quality of voice transmission is the same for both directions of any particular connection. Thus, the system only measures voice transmission quality in the direction from the remote telephone terminals to the PBX.

In recent years, telephony has been implemented over communications networks, such as Local Area Networks (LAN), that were previously utilized exclusively for data communications. Voice information that is transmitted over a LAN is digitized and organized into voice data packets which are transmitted to and from two or more endpoints that are participating in a call. Telephony in a data network environment such as a LAN differs from conventional analog and digital telephony in several key aspects. Firstly, the bandwidth utilized for transmitting the voice information over the LAN is shared among all of the users of the LAN. If network traffic increases after a call has been made, it is possible that transmission delays on the network will negatively impact the quality of voice transmissions within the call. Secondly, in a voice call over the LAN, it is possible that a transmission path for voice information from a first endpoint to a second endpoint will be different than the transmission path from the second endpoint to the first endpoint.

The technique described in Vittorelli for testing distortion and attenuation characteristics of a connection on one occasion, so as to condition the connection for future calls is less effective for telephony in a data network environment. This is because distortion and attenuation characteristics are more dynamic on data networks than on conventional analog or digital telephone networks.

What is needed is a system and a method for providing quantitative measurements of voice transmission quality in data network environments, with the system and method being adapted for the unique transmission characteristics of data networks.

SUMMARY OF THE INVENTION

A method and a system for providing quantitative measurements of voice transmission quality over a communications network include transmitting a voice sample to a receiving site and utilizing a speech recognition module to execute a speech recognition session on the transmitted voice sample at the receiving site. The data resulting from the speech recognition session is compared to the known speech content of the voice sample to calculate a degree of accuracy for the speech recognition session. The accuracy of the speech recognition session is utilized to calculate the voice transmission quality of at least a portion of the network.

In one embodiment, the method and system are performed within a packet-based data network such as a LAN. The quantitative measurement of voice transmission quality has two important aspects. First, the LAN is qualified for its suitability as a voice communications network. This involves obtaining a known voice sample and transmitting it to the receiving site a number of times. The receiving site can be either a terminal which is remotely located from the transmitting terminal or it can be the transmitting terminal itself (e.g., a loopback test). The terminal may be a standard user-dedicated workstation on the network. In fact, all of the user-dedicated terminals of a LAN may be configured to quantify the suitability of the LAN for voice transmissions before each terminal-to-terminal session initiated by the user-dedicated terminal. Prior to each transmission of the voice sample, a noise source introduces a variable amount of distortion into the voice sample, such that the amount of distortion introduced is incrementally increased in successive transmissions. As the amount of noise added to the voice sample increases, the accuracy of speech recognition is continuously monitored to determine the point at which the accuracy of speech recognition drops below a threshold level. If the accuracy of speech recognition drops below the threshold level with the addition of only a small amount of noise, this indicates that the LAN is poorly suited for voice communications. The reason for the LAN having a low tolerance for noise might be that routers on the LAN under high bandwidth, high traffic conditions, will drop data packets and introduce excessive delay into transmissions (for traditional data transmission, this is not a problem, because the data packet can be automatically resent later; however, with voice or other real time communication, this is often not practical). The level of speech recognition accuracy prescribed by the threshold is based on a minimum level of voice transmission quality which is acceptable for voice communications.

The second aspect of the quantitative measurement of voice transmission quality involves periodically monitoring the LAN during its normal operation to verify that it is capable of supporting the minimum level of voice transmission quality. In this case, the transmitting device transmits the voice sample to a receiving device over the network either prior to or during a call. The speech recognition module in the receiving device analyzes the received voice sample to determine its speech content. If the accuracy of speech recognition falls below the threshold, then an alarm condition is triggered on the LAN.

The alarm condition can include a range of possible responses. If the voice transmission quality is tested prior to the call being established, the call can be routed over an alternate network (i.e., one other than the LAN). If an alternate transmission path which has a higher voice transmission quality is available within the LAN, the call can be rerouted over the alternate transmission path. Alternatively, the transmitting device can request that more network bandwidth be allocated to the call, or the voice compression level can be altered to increase the voice transmission quality.

Voice transmission quality can be monitored throughout multiple segments of the LAN by performing speech recognition accuracy tests between different endpoints which span the various segments of the LAN. When one of the endpoints detects a LAN segment having sub-threshold speech recognition, a network administrator can be alerted.

Voice transmission quality testing can be further refined to isolate components of distortion introduced into voice samples by first and second endpoints and by the transmission path(s) between the endpoints. To determine a quantity of distortion introduced into voice samples by the first endpoint due, for example, to compression of voice data, the first endpoint transmits the voice sample over a local loop and performs a speech recognition accuracy test. The local loop can be internal to the first endpoint. The voice sample is transmitted over a first transmission path to the second endpoint to determine a level of distortion introduced by the transmission path. By subtracting the distortion introduced by the first endpoint, which was identified in the local loop test, from the total distortion introduced into the voice sample during the transmission from the first to the second endpoint, the distortion introduced by the media of the first transmission path is isolated. By performing speech recognition accuracy tests on local loops from the various endpoints of the LAN and performing speech recognition accuracy tests for transmission paths between the various endpoints of the LAN, a detailed account can be produced for voice transmission quality for the entire LAN.

Leveraging the convergence aspects of Voice over Packet networks and the availability of voice recognition technology in today's workstation, the invention can be provided without the addition of dedicated custom hardware, and it allows for continuous, on-going evaluation of the communication network. Moreover, the present invention is easier to use than prior art approaches that employ expensive test equipment.

DETAILED DESCRIPTION

Figure 1:
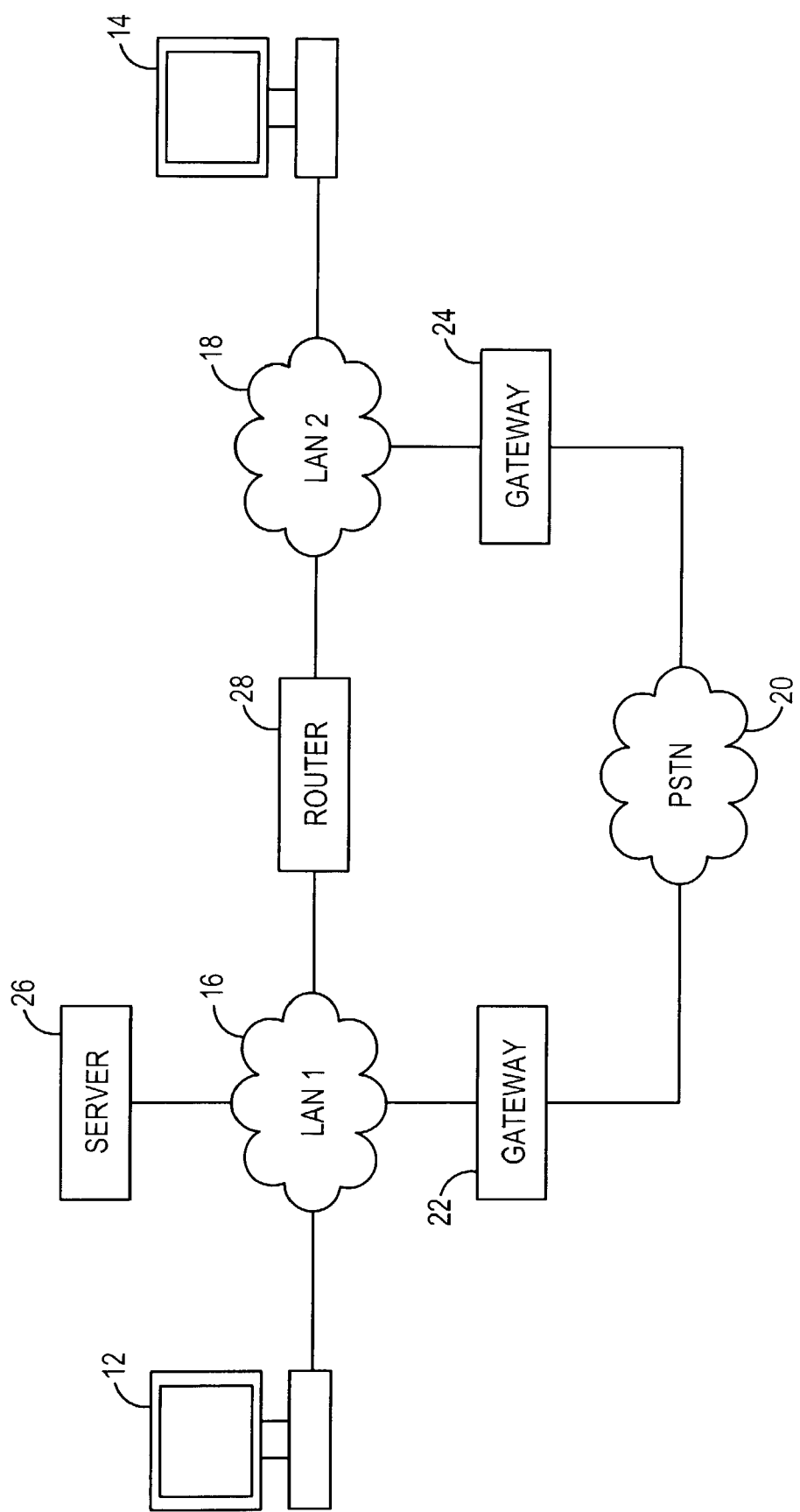
FIG. 1 is a block diagram of a system for measuring voice quality for transmissions over a packet-based network according to the present invention.

With reference to FIG. 1, a system for measuring the quality of voice transmissions over a packet-based data network, such as a first Local Area Network 16, includes a first telephony-enabled terminal 12 and a telephony server 26. The first terminal 12 can be a telephony-enabled personal computer or any other device which is capable of supporting telephony. For simplicity, only the first terminal 12 and the telephony server 26 are shown as connected to the first LAN 16. However, the first LAN 16 can support numerous telephony-enabled terminals. A first gateway 22 provides telephony-enabled terminals on the first LAN 16 with access to a Public Switch Telephone Network (PSTN) 20. The first LAN 16 is connected via a router 28 to a second LAN 18 to enable the first terminal 12 to communicate with a second telephony-enabled terminal 14. A second gateway 24 is connected to the second LAN 18 to enable the second terminal 14 to communicate with the first terminal 12 via the PSTN 20. As will be discussed in greater detail below, the PSTN 20 provides an alternate telephone connection between the second terminal 14 and the first terminal 12 in the event that voice transmission quality over the first 16 and second 18 LANs is unacceptable.

Telephony connections over data networks, such as the first and second LANs 16 and 18, typically utilize the Transmission Control Protocol/Internet Protocol (TCP/IP) protocol suite. Internet Protocol (IP) telephony utilizes User Datagram Protocol (UDP) to transmit digitized voice information. UDP is not a guaranteed delivery protocol, so if one or more UDP packets are lost during a call, the quality of the received voice signal is distorted. Even if a guaranteed delivery protocol is utilized, the quality of the received voice signal is not likely to be improved, because by the time a re-transmitted voice packet is received, the sequence of voice information with which the retransmitted packet is associated will most likely already have been presented to a user. Alternatively, significant, user noticeable, delay would need to be introduced, if the packets were buffered to ensure that the correct sequence could be reconstructed, since the delay would need to be longer than the longest retransmission period.

Another source of distortion affecting voice transmissions is the processing that provides compression of digitized voice data. The voice data is compressed in order to decrease the bandwidth required for transmission. Speech compression strips redundant information from the input voice signal based on statistical characteristics of human speech. However, speech compression algorithms occasionally strip nonredundant voice information from the input voice signal, which results in distortion of the voice signal.

Voice data packets which are transmitted within an IP-telephony call must compete for network bandwidth with other data packets transmitted between terminals outside of the IP-telephony call. During periods of high network traffic, the competition for bandwidth can result in distortion of voice information in a call if routers on the network drop data packets. Furthermore, a high level of network traffic can result in packet loss at a receiving end of a call if the capacity of the buffer at the receiving end is exceeded.

The present invention utilizes speech recognition technology to calculate voice transmission quality over packet-based data networks, such as the first 16 and second 18 LANs. Unlike prior art methods of calculating voice transmission quality, speech recognition provides a direct indication of the extent to which voice transmissions are understandable. In contrast, prior art techniques indirectly measure voice transmission quality in terms of packet loss and/or spectral distortion.

Figure 2:
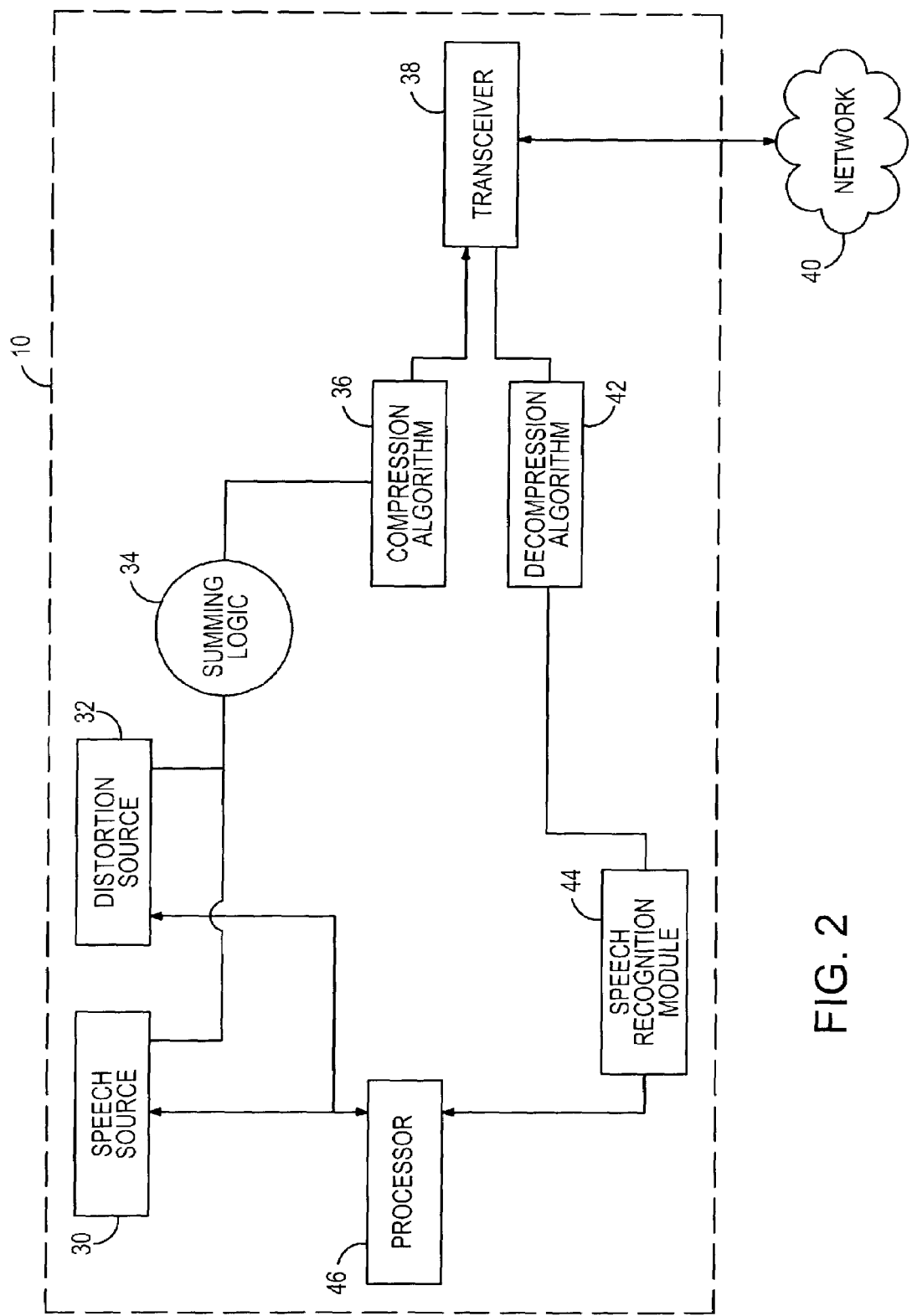
FIG. 2 is a block diagram of the functional components for an endpoint of the system shown in FIG. 1.

With reference to FIGS. 1 and 2, each telephony-enabled terminal on the first 16 and second 18 LANs includes a voice transmission quality subsystem 10. A speech source 30 stores voice samples including phrases, words, and phonemes. The voice samples are transmitted among the telephony-enabled terminals during speech recognition accuracy tests. In a preferred embodiment, the terminals are assigned voice samples which uniquely identify each terminal to enable connection validation. At the outset of a speech recognition accuracy test, the first terminal 12 transmits its uniquely assigned voice sample to the second terminal 14 and, in response, the second terminal 14 transmits its uniquely assigned voice sample to the first terminal 12. By performing speech recognition on the received voice samples, the first 12 and second 14 terminals are able to verify each other's identity as a start to the speech recognition accuracy test.

A distortion source 32 is provided to introduce variable amounts of noise into voice samples. A processor 46 controls both the selection of voice samples from the speech source and the level of noise to be introduced by the distortion source 32 into the voice samples. Summing logic 34 combines voice signals with noise signals, if any noise is to be introduced into a particular voice sample, and passes the combined signals to a data compression algorithm 36. After compressing the signals, the compression algorithm 36 provides the compressed signals to a transceiver 38 which transmits the signals to a receiving terminal.

If the subsystem 10 is a receiving site during a speech recognition accuracy test, the transceiver 38 receives voice data packets from a network 40 (e.g., the first 16 or second 18 LAN) and provides the voice data packets to a decompression algorithm 42. The decompression algorithm 42 decompresses voice data in the voice data packets and passes the decompressed voice data to a speech recognition module 44. The speech recognition module 44 performs speech recognition on the voice samples. The speech recognition module 44 sends the speech recognition data generated by the speech recognition analysis to the processor 46, which compares the results to known speech content of the received voice samples. The accuracy of the speech recognition analysis provides the measure of voice transmission quality over the network 40.

Figure 3:
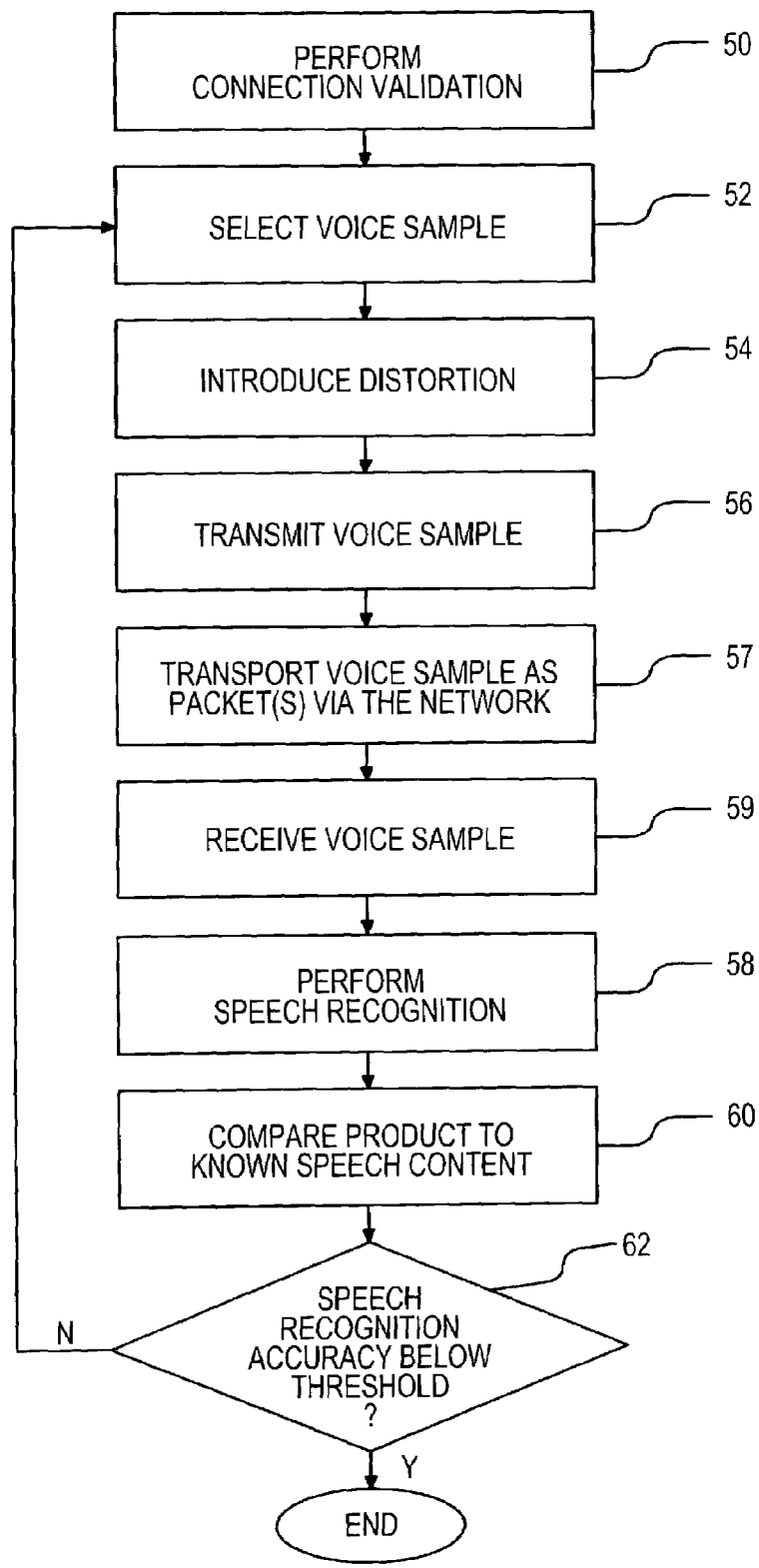
FIG. 3 is a process flow of a method for qualifying a network for voice communications utilizing the system of FIG. 1.

Quantitative measurement of voice transmission quality according to the present invention includes two important aspects. A first aspect involves testing a network to qualify the fitness of the network for voice communications. A second aspect involves periodically monitoring the network to determine voice transmission quality over the network during its normal operation. Referring to FIGS. 1, 2, and 3, a method for qualifying the fitness of a network for voice communications includes a step 50 of validating a connection between a transmitting terminal and a receiving terminal. Validating the connection involves transmitting from the transmitting terminal, for example the first terminal 12, a voice sample which uniquely identifies the first terminal 12. A receiving terminal, for example the second terminal 14, performs speech recognition on the received voice sample to identify the first terminal 12. The second terminal 14 transmits a voice sample uniquely identifying the second terminal 14 to the first terminal 12. The first terminal 12 performs speech recognition on the received voice sample to validate the connection. By validating the connection, the voice transmission quality data which results from a speech recognition accuracy test can be correlated specifically to a LAN segment which spans the transmission path between the first 12 and second 14 terminals. By performing speech recognition accuracy tests over the various segments of the first and second LANs 16 and 18 and correlating the speech recognition accuracy tests with the LAN segments, a detailed picture of voice transmission quality within the LANs emerges.

After connection validation has been performed at step 50, a voice sample from the speech source 30 of the first terminal 12 is selected at step 52 for transmission to the second terminal 14. The selected voice sample can be a phrase, a word, or a phoneme. Although in the present example the transmitting device is the first terminal 12 and the receiving device is the second terminal 14, the transmitting device and the receiving device can be any telephony-enabled devices on the first 16 or second 18 LAN. For example, the telephony server 26 can be utilized to qualify all of the telephony-enabled terminals on the first LAN 16 by transmitting voice samples to each of the terminals. Alternatively, each telephony-enabled terminal can transmit voice samples to another telephony-enabled terminal or the telephony server 26, either as part of a point-to-point transmission or as part of a loopback test.

At step 54, the distortion source 32 in the first terminal 12 introduces a predetermined amount of noise into the voice sample. In the first transmission of a speech recognition accuracy test to qualify a network for its suitability for voice transmissions, the amount of noise which is introduced into the voice sample is relatively low. As will be discussed in greater detail below, the amount of noise introduced into the voice sample is incrementally increased in successive transmissions. The summing logic 34 in the first terminal 12 combines the noise signal generated by the distortion source 32 with the signal of the voice sample. The compression algorithm 36 compresses the voice data of the combined signal and, at step 56, the transceiver 38 transmits the voice sample to the second terminal 14.

In steps 57 and 59, the voice sample is transported over the network (or networks) and is received at the second terminal 14. The decompression algorithm 42 of the second terminal 14 decompresses the received voice sample and the speech recognition module 44 performs speech recognition on the voice sample at step 58. Speech recognition data which is generated at step 58 is provided to the processor 46 of the second terminal 14. The processor 46 compares the speech recognition data to the known speech content of the voice sample at step 60 to determine the speech recognition accuracy for the transmission. The speech recognition accuracy provides a measure for voice transmission quality. A speech recognition accuracy test to qualify the network for suitability for voice communications is preferably performed when there is a known low level of network traffic on the first and/or second LANs, so that the calculated voice transmission quality is correlated to a specific network traffic level. For example, if a relatively small amount of noise added to a voice sample results in a low accuracy of speech recognition at the receiving site when there is no network traffic, it is clear that the network is inherently not well suited for voice communications. However, if the amount of network traffic during the speech recognition test is unknown or is high, it is not possible to isolate the cause of low speech recognition accuracy.

At step 62, the processor 46 in the second terminal 14 determines whether the calculated speech recognition accuracy falls below a predetermined accuracy threshold. The threshold is correlated to the minimum voice transmission quality level which is acceptable for voice communications. If the first transmission with a low level of added noise results in a speech recognition accuracy level which is below the minimum threshold, the network is probably not well suited for voice communications. To isolate the cause of the low accuracy for the speech recognition test, a local loopback test can be performed from the first terminal 12. The local loop can be internal to the first terminal 12, or it can be a small portion of the media of the first LAN 16. The voice sample is transmitted over the local loop without adding any noise to the voice sample and speech recognition is performed by the first terminal 12. If the local loopback test results in a sub-threshold speech recognition accuracy measurement, it is possible that the compression algorithm 36 might be introducing an unacceptable level of noise into voice samples. If the speech recognition accuracy for the local loopback test is high, then the transmission path between the first and second terminals 12 and 14 is likely responsible for the low speech recognition accuracy.

If the speech recognition accuracy of the first transmission to qualify the transmission path between the first and second terminals 12 and 14 is above the predetermined threshold, the speech recognition accuracy test is repeated. The amount of noise introduced into the voice sample is incrementally increased in each subsequent transmission until the speech recognition accuracy falls below the accuracy threshold. The tolerance which the transmission path has for noise is reflected in the amount of noise which causes the threshold to be exceeded. That is, the higher the amount of noise which is required to cause the speech recognition accuracy to fall below the threshold, the higher the noise tolerance for the transmission path. The noise tolerance of the transmission path provides an indication of how suitable the transmission path is for voice communications. By testing each LAN segment, the suitability for voice communications of both the first and second LANs 16 and 18 can be determined.

Figure 4:
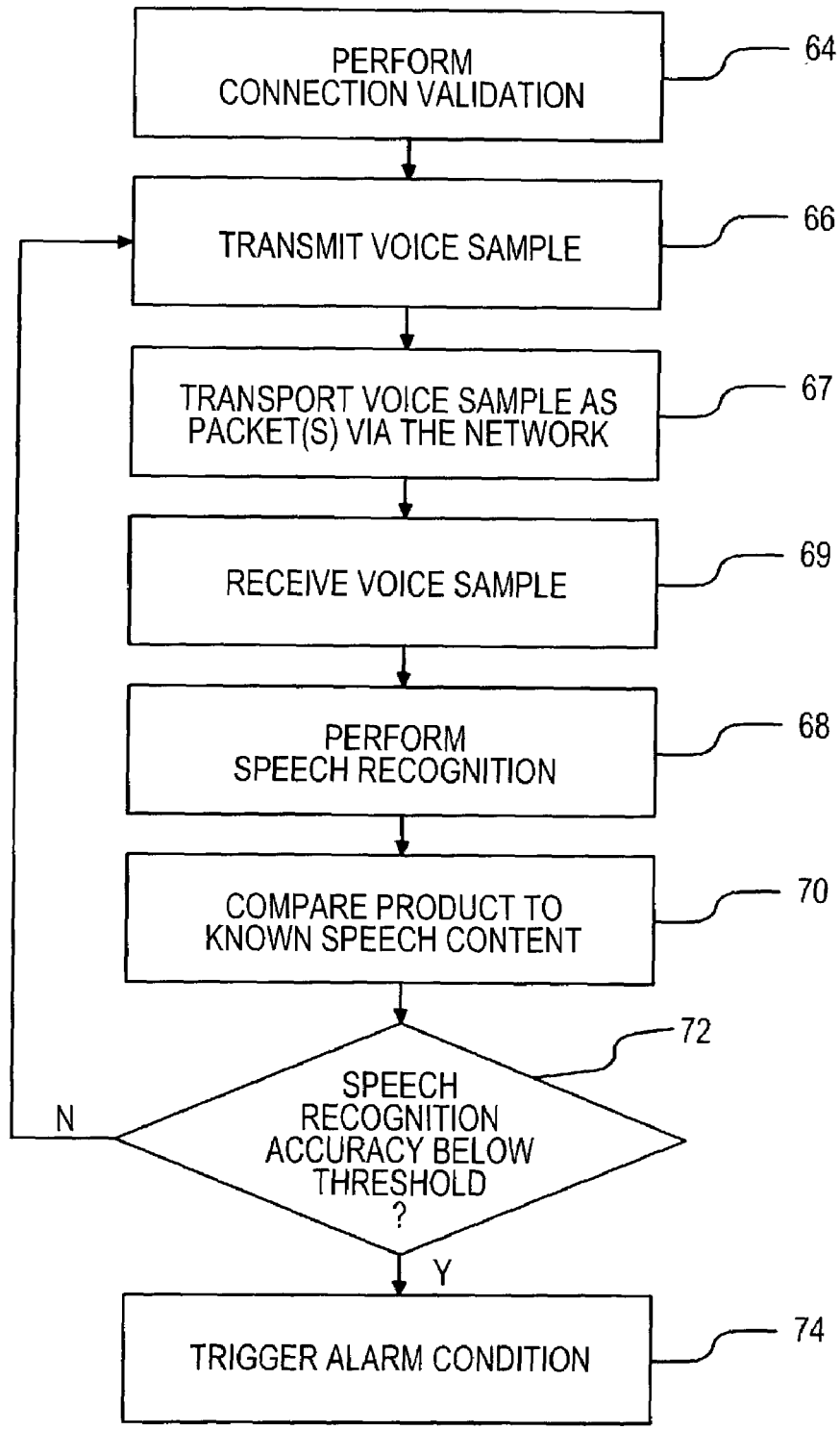
FIG. 4 is a process flow of a method for measuring voice quality for transmissions over a network utilizing the system of FIG. 1.

After the first 16 and second 18 LANs have been qualified for voice communications suitability, it is desirable to monitor the networks during their normal operation to periodically determine whether they continue to be suitable for voice communications. With reference to FIGS. 1, 2, and 4, a method for calculating voice transmission quality over the networks during their normal operation includes a step 64 of validating a connection between two endpoints within the first 16 and second 18 LANs, for example the first 12 and second 14 telephony-enabled terminals. The connection validation step is performed in the same manner as the connection validation step performed during the qualification of the networks for voice communications suitability. In steps 66 and 67, a voice sample is transmitted from the first terminal 12 to the second terminal 14 and is transported over the network or networks. The voice sample is received at the second terminal 14, as indicated at step 69. The speech recognition module 44 of the second terminal 14 performs speech recognition on the received voice sample at step 68. The processor 46 of the second terminal 14 compares speech recognition data generated at step 68 to the known speech content of the voice sample at step 70 to determine at step 72 if the speech recognition accuracy of the transmission from the first terminal 12 is below the minimum threshold.

In contrast to conventional analog and digital telephony, two endpoints in a telephony-over-LAN call do not necessarily share a single bi-directional connection. For example, a first transmission path for voice information transmitted from the first terminal 12 to the second terminal 14 might very well be separate and distinct from a second transmission path for voice information transmitted from the second terminal 14 to the first terminal 12. In a telephony-over-LAN call in which two separate transmission paths are utilized, the speech recognition accuracy test is performed on both transmission paths and, if the speech recognition accuracy for either transmission path is below the minimum threshold, an alarm condition is triggered at step 74. If only a single transmission path is utilized during the call, the alarm condition is triggered if the speech recognition accuracy of transmissions over the transmission path falls below the minimum threshold.

The alarm condition can include a range of responses. Each response can be performed as an alternative, or some combination of responses can be performed together. If the speech recognition accuracy test is performed prior to a call being established and it is determined that the voice transmission quality is not acceptable, the call can be routed over a network other than the first 16 and/or second 18 LAN. For example, a speech recognition accuracy test performed prior to a call being established between the first 12 and second 14 terminals might reveal that a transmission path between the first and second terminals is not providing an acceptable voice transmission quality. This might be the result of the router 28 having to handle an excessive amount of network traffic. In this event, a connection via the first gateway 22, the PSTN 20, and the second gateway 24 might provide a connection with an acceptable voice transmission quality. If the speech recognition accuracy test reveals a sub-threshold voice transmission quality during a telephony-over-LAN call, the call can be transferred onto the PSTN 20.

Another response includes requesting additional bandwidth for the call between the first and second terminals 12 and 14 in order to decrease the amount of delay and jitter which might be depressing the voice transmission quality. The terminals within a telephony-over-LAN call can also vary the compression for voice information within a call, if the compression of voice information is responsible for the sub-threshold voice transmission quality. If an alternative transmission path is available within the first and/or second LANs 16 and 18, the call can be rerouted within the first and second LANs via the alternate transmission path.

As an additional feature of the invention, the first and second terminals 12 and 14 may be configured to automatically provide on-going monitoring of the network, when the terminals are in otherwise idle states. That is, if the terminals are currently unused, exchanges of voice samples may be employed to periodically or continuously provide quantitative measurements of voice transmission quality over the network. The terminals may execute the network monitoring despite being primarily dedicated to daily operations by specific users.

What is claimed is:

1. A method for providing quantitative measurements of voice transmission quality over a communications network comprising the steps of:
    (a) transmitting a voice sample over said communications network such that said voice sample is included in a transmission to a receiving site;
    (b) executing a speech recognition session on said transmitted voice sample at said receiving site;
    (c) comparing a product of said speech recognition session to known speech content of said voice sample to determine an accuracy of said speech recognition session; and
    (d) calculating a voice transmission quality for at least a portion of said communications network based on said accuracy of said speech recognition session.

2. The method of claim 1 wherein said transmitting step includes inserting a predetermined amount of distortion into said voice sample to determine a tolerance that the operation of step (b) has for distortion within said communications network.

3. The method of claim 2 wherein steps (a) through (d) are repeated such that each repetition of said transmitting step includes varying said predetermined amount of distortion inserted into said voice sample.

4. The method of claim 3 wherein said repetition of steps (a) through (d) is performed to determine a suitability of said communications network for voice communications.

5. The method of claim 1 wherein said transmitting step is performed during a call, the method further comprising the steps of:
    ascertaining whether said voice transmission quality falls below a predetermined voice transmission quality threshold; and
    triggering an alarm condition for said call if said voice transmission quality falls below said threshold.

6. The method of claim 5 wherein said triggering step includes one of reallocating network bandwidth within said communications network, adjusting a level of voice data compression within said call, transferring said call to an alternate network, and rerouting said call to a different transmission path within said communications network.

7. The method of claim 1 wherein said steps (a) through (d) are performed first within a local loop within said communications network to determine a level of distortion introduced into said voice sample by a transmitting device, said steps (a) through (d) being repeated within a remote loop to determine a level of distortion introduced into said voice sample by a transmission path on said communications network.

8. The method of claim 1 wherein said steps (a) through (d) are performed on multiple local loops and multiple remote loops within said communications network to isolate regions within said network having low voice transmission qualities and devices on said network which introduce substantial levels of distortion into voice transmissions.

9. The method of claim 1 wherein said step (a) includes transmitting a voice sample uniquely associated with a transmitting communication device to said receiving site, said step (b) including determining an identity of said transmitting communication device based on said uniquely associated voice sample.

10. The method of claim 1 wherein said steps (a) through (d) are performed during a call over a first transmission path from a first endpoint to a second endpoint, said steps (a) through (d) also being performed during said call on a second transmission path from said second endpoint to said first endpoint.

11. The method of claim 1 wherein said steps (a) through (d) are repeatedly executed by first and second computer terminals on said communications network when said computer terminals are in idle states for selected time periods.

12. A system for quantitatively measuring voice transmission quality within a communications network comprising:
    a speech source having storage for predetermined voice samples;
    a speech recognition module connected to said communications network to receive transmissions of said voice samples generated by said speech source; and
    a processor connected to said speech recognition module to receive speech recognition data associated with said voice samples received over said communications network, said processor being responsive to said speech recognition data to compare said speech recognition data to known speech content of said voice samples to calculate voice quality for said transmissions.

13. The system of claim 12 further comprising a distortion source connected to said speech source to introduce variable levels of distortion into said voice samples during successive transmissions, said processor being configured to determine a suitability of said communications network for voice communications based on calculated voice quality for said successive transmissions.

14. The system of claim 12 further comprising a voice transmitter configured to transmit a voice sample to said voice recognition module during a call, said processor being configured to determine whether voice transmission quality for transmissions of said voice sample falls below a predetermined voice transmission quality threshold.

15. The system of claim 14 wherein said processor is configured to transfer a call from said communications network to an alternate network in response to a voice transmission during said call which is determined to fall below said voice transmission quality threshold.

16. The system of claim 12 further comprising a transmitter configured to transmit a voice sample over a local loop and a remote loop of said network, said processor being configured to determine a first quantity of distortion introduced into said voice sample by a transmitting communication device based on a transmission received over said local loop, said processor being further configured to determine a second quantity of distortion introduced into said voice sample by a transmission path on said communications network based on a comparison of said first level of distortion introduced by said transmitting device to a total quantity of distortion present in said voice sample received over said transmission path.

17. A method for quantitatively measuring voice transmission quality in a packet-based data communications network comprising the steps of:

transmitting a test voice data packet including a known voice sample from a first endpoint to a second endpoint in said packet-based data communications network prior to or during a call between said first endpoint and a second endpoint;

utilizing a speech recognition algorithm to analyze said voice sample;

computing a voice transmission quality of said transmitted voice sample based on the accuracy of said speech recognition analysis;

determining whether said voice transmission quality is above a predetermined threshold; and triggering an alarm condition for said call if said transmission quality is below said predetermined threshold.

18. The method of claim 17 wherein said triggering step includes one of routing said call over a communications network other than said packet-based data communications network, reallocating network bandwidth within said packet-based data communications network, and adjusting a level of voice data compression within said call.

19. The method of claim 17 wherein said transmitting step includes transmitting said voice sample from said first endpoint over a local loop to calculate a level of distortion introduced into said voice sample by said first endpoint.

20. The method of claim 19 further comprising the step of transmitting said voice sample from said second endpoint over a local loop to calculate a level of distortion introduced into said voice sample by said second endpoint.

21. The method of claim 17 wherein said step of transmitting said voice sample is performed over a first transmission path between said first and said second endpoints, the method further comprising the step of transmitting said voice sample from said second endpoint over a second transmission path to said first endpoint to calculate a voice transmission quality for said second transmission path.

22. The method of claim 17 wherein user-dedicated computer terminals are employed to recurringly monitor said voice transmission quality by executing said steps at said first and second endpoints, said recurring monitoring being executed when said computer terminals are determined to be in idle states.

* * * * *